United States Patent [19]

Yamaguchi

[11] Patent Number: 5,432,328
[45] Date of Patent: Jul. 11, 1995

[54] NON-CONTACT IC CARD DETECTING POWER-ON SIGNAL BY RECEIVING EXTERNAL INPUT SIGNAL HAVING VOLTAGE MAGNITUDE OUTSIDE POWER SUPPLY VOLTAGE RANGE

[75] Inventor: Atsuo Yamaguchi, Itami, Japan

[73] Assignee: Mitsubishi Denki Kabushiki Kaisha, Tokyo, Japan

[21] Appl. No.: 471,494

[22] Filed: Jan. 9, 1990

[30] Foreign Application Priority Data

Oct. 17, 1989 [JP]  Japan .................................. 1-268159

[51] Int. Cl.⁶ .............................................. G06F 1/32
[52] U.S. Cl. .................................... 235/449; 235/493; 395/750; 364/DIG. 1; 364/273.2
[58] Field of Search ................ 395/750; 235/492, 449, 235/450, 451, 454, 455, 493

[56]  References Cited

U.S. PATENT DOCUMENTS

| | | | |
|---|---|---|---|
| 4,641,374 | 2/1987 | Oyama | 359/154 |
| 4,661,691 | 4/1987 | Halpern | 235/449 |
| 4,798,322 | 1/1989 | Bernstein et al. | 235/487 |
| 4,812,634 | 3/1989 | Ohta et al. | 235/492 |
| 4,843,224 | 6/1989 | Ohta et al. | 235/492 |
| 4,851,654 | 7/1989 | Nitta | 235/492 |
| 5,013,898 | 5/1991 | Glasspool | 235/492 |
| 5,047,988 | 9/1991 | Mizuta | 235/492 |
| 5,068,521 | 11/1991 | Yamaguchi | 235/492 |

FOREIGN PATENT DOCUMENTS 0217654  4/1987  European Pat. Off. .
0294880  12/1988  European Pat. Off. .

OTHER PUBLICATIONS

Grebene, *Biopolar and MOS Analog Integrated Circuit Design*, John Wiley & Sons, 1984, New York, pp. 233-239 (pp. 170-176 & 276-284 also cited/background of current mirrors).

Primary Examiner—Parshotam S. Lall
Assistant Examiner—Richard Ellis
Attorney, Agent, or Firm—Leydig, Voit & Mayer

[57]  ABSTRACT

A microcomputer includes a CPU for processing data, a memory for storing a program for operating the CPU, an input circuit for detecting an input signal exceeding a threshold voltage that lies outside a range from zero volts to a power supply voltage and for supplying a detected input signal exceeding the threshold voltage to the CPU and an output circuit for outputting from the microcomputer a signal output by the CPU. The input circuit reduces power consumption and may include a differential circuit having a pair of transistors with different electrical characteristics, eliminating the need to establish a reference voltage with resistors or other components.

6 Claims, 3 Drawing Sheets

NON-CONTACT IC CARD DETECTING POWER-ON SIGNAL BY RECEIVING EXTERNAL INPUT SIGNAL HAVING VOLTAGE MAGNITUDE OUTSIDE POWER SUPPLY VOLTAGE RANGE

BACKGROUND OF THE INVENTION

1. Field of the Invention

The present invention relates to a microcomputer and a non-contact IC card using the same, and, more particularly, to a technology capable of reducing their power consumption.

2. Description of the Related Art

FIG. 4 is a schematic view which illustrates a conventional non-contact IC card. A ROM 2A, a RAM 2B, a transmitting circuit 3, and a receiving circuit 4 are respectively connected to a CPU 1 as a microcomputer 5. A data transmitting antenna 6 and a data receiving antenna 7 are respectively connected to the transmitting circuit 3 and the receiving circuit 4 of the microcomputer 5, while a battery 8 and an oscillator 9 are connected to the CPU 1. In order to improve environmental resistance, the IC card is fully sealed with resin or the like.

Power supply voltage is supplied to the CPU 1 from the battery 8 and clock signals are supplied from the oscillator 9 so that the CPU 1 acts in accordance with a program previously stored in the ROM 2A. The IC card is capable of transmitting and receiving data from external devices by using electromagnetic waves. When data are received, external electromagnetic waves are received by the data receiving antenna 7 and demodulated by the receiving circuit 4 into data which are supplied to the CPU 1. The data thus supplied to the CPU 1 are processed and stored in the RAM 2B if necessary. On the other hand, when data are transmitted, data are output from the CPU 1 to the transmitting circuit 3 in which a carrier wave is modulated by the data. The modulated carrier wave is transmitted through the data transmitting antenna 6.

In general, the IC card is waiting for external electromagnetic waves, and the operations of the CPU 1, ROM 2A, RAM 2B, and the transmitting circuit 3 in the microcomputer 5 are stopped in order to prevent electric power consumption from the battery 8. However, since it is always necessary to always supervise the external electromagnetic waves, the operation of the receiving circuit 4 cannot be stopped. When electromagnetic waves are received by the data receiving antenna 7 in the above-described waiting state, the operation of the CPU 1 is restarted by the receiving circuit 4, and, in synchronization, the ROM 2A, the RAM 2B, and the transmitting circuit 3 are also operated. As a result, sequential processing such as data processing, data storage, and data transmissions take place, and then the IC card is again brought into the waiting state.

FIG. 5 is a schematic view which illustrates the receiving circuit 4. A capacitor 11 is connected in parallel with the data receiving antenna 7 as a resonant circuit 12 for receiving electromagnetic wave of a predetermined frequency. On the other hand, resistors 13 and 14 for determining a reference voltage are connected between a power source and ground, the resistors 13 and 14 being connected in series. A differential circuit includes P-channel transistors 15 and 16 to which P-channel transistors 17 and 18 are respectively connected, the P-channel transistors 17 and 18 being arranged to shift the level of the input voltage generated in the resonance circuit 12 and the level of the reference voltage generated by the resistors 13 and 14, respectively. A current mirror circuit including N-channel transistors 19 and 20 is connected to the differential circuit as a load. The P-channel transistors 21, 22, and 23 are provided for supplying bias currents to the transistors 17, 18 and the transistors 15 and 16 of the differential circuit.

The levels of the input voltage generated in the resonance circuit 12 in accordance with the received electromagnetic wave and the reference voltage generated by the resistors 13 and 14 are shifted in the transistors 17 and 18, respectively. The thus level-shifted voltages are supplied to the differential circuit to be compared with each other. As a result, an output signal corresponding to the received electromagnetic wave is output through a junction A of the transistors 15 and 19 to the CPU 1.

The operation of the receiving circuit 4 cannot be stopped even if the IC card is in a waiting state. Bias currents are always allowed to pass through the transistors 15 to 18 via the transistors 21 to 23 and a current is always allowed to pass through the resistors 13 and 14 in order to obtain the reference voltage. If the bias current to be supplied to the transistors 15 to 18 is reduced, the frequency characteristics of the receiving circuit 4 deteriorate. Therefore, it is necessary to pass a bias current of a certain high level through the transistors 15 to 18.

As a result, a problem concerning excessive power consumption of the IC card and another problem concerning short durability of the battery 8 arise. In particular, in the case where the battery cannot be replaced, the life of the IC card is shortened.

SUMMARY OF THE INVENTION

The present invention is found to overcome the above-described problems. Therefore, an object of the present invention is to provide a microcomputer whose power consumption can be reduced.

Another object of the present invention is to provide a non-contact IC card using the microcomputer of this type, the non-contact IC card thereby exhibiting reduced power consumption.

A microcomputer according to the present invention comprises a CPU for processing data; a memory for storing a program for operating the CPU; an input circuit for detecting an input signal and determining whether the signal level is outside a range of a power supply voltage for supplying the detected input signal to the CPU; and an output circuit for outputting a signal delivered from the CPU.

The input circuit may comprise a differential circuit for judging the level of the input signal and a current mirror circuit as a load to the differential circuit and including a pair of transistors, each of the transistors having different characteristics i.e., performance.

A non-contact IC card according to the present invention comprises antenna means for transmitting and receiving data to and from an external device in a non-contact manner; a CPU for processing data; a battery for supplying a power supply voltage to the CPU; a memory for storing a program for operating the CPU; a receiving circuit for detecting a signal received by the antenna means with a detection level means for determining whether the signal level is outside the range of the power supply voltage and for supplying the detected signal to the CPU; and a transmitting circuit for transmitting a signal delivered from the CPU through the antenna means.

DESCRIPTION OF THE PREFERRED EMBODIMENTS

Figure 1:
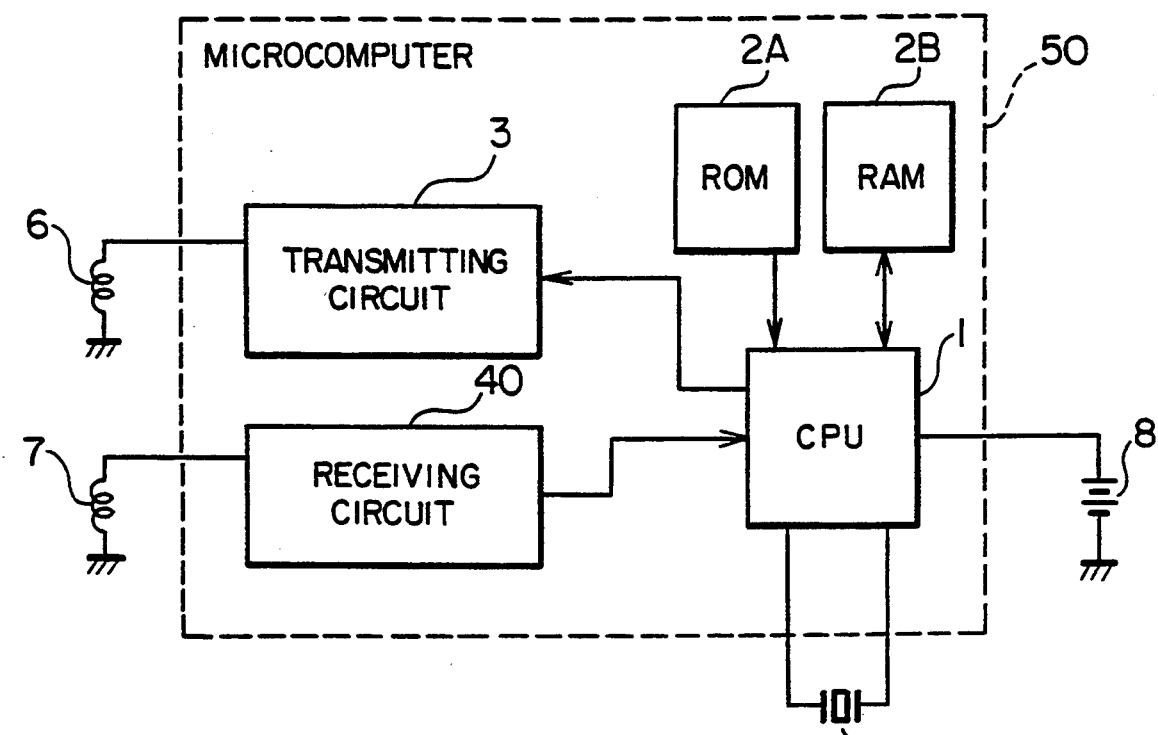
FIG. 1 is a block diagram which illustrates the structure of an embodiment of a non-contact IC card according to present invention.

Referring to FIG. 1, a non-contact IC card comprises a microcomputer 50, a data transmitting antenna 6, a data receiving antenna 7, a battery 8, and an oscillator 9. The microcomputer 50 is formed on an IC chip and comprises a CPU 1 which performs data processing, a ROM 2A, a RAM 2B, a transmitting circuit (an output circuit) 3, and a receiving circuit (an input circuit) 40, which are respectively connected to the CPU 1. The data transmitting antenna 6 and the data receiving antenna 7 are respectively connected to the transmitting circuit 3 and the receiving circuit 40 of the microcomputer 50, while the battery 8 and the oscillator 9 are connected to the CPU 1.

The data transmitting antenna 6 and the data receiving antenna 7 form antenna means. A program for operating the CPU 1 is previously stored in the ROM 2A. Furthermore, in order to improve the environmental resistance of this non-contact IC card, the whole body of it is sealed with a resin or the like.

Then, the operation will be described. Power supply voltage $V_{CC}$ is supplied from the battery 8 to the CPU 1 and a clock signal is supplied to the same from the oscillator 9. The IC card is usually waiting for external electromagnetic waves. In the waiting state, the operations of the CPU 1, the ROM 2A, the RAM 2B, and the transmitting circuit 3 in the microcomputer 50 are stopped in order to prevent power consumption from the battery 8, and only the receiving circuit 40 is in an operable state. In the receiving circuit 40, a threshold level (detection level) $V_{TH}$ is established outside of the range of the power supply voltage $V_{CC}$ supplied from the battery 8.

In this waiting state, external electromagnetic waves are always supervised by the data receiving antenna 7 and the receiving circuit 40 so that the receiving circuit 40 detects received data by comparing the level of the signal received by the data receiving antenna 7 with the threshold level $V_{TH}$. When received data is detected by the receiving circuit 40, the thus received data is output to the CPU 1. As a result, the CPU 1 is brought into an operating state. In synchronization with this, the ROM 2A, the RAM 2B, and the transmitting circuit 3 are also brought into an operating state. The CPU 1 performs data processing in accordance with the program previously stored in the ROM 2A. If necessary, the CPU 1 causes data to be stored in the RAM 2B or to be transmitted outward. When data is transmitted, data is output from the CPU 1 to the transmitting circuit 3 in which a carrier wave is modulated by the data and then the modulated carrier wave is transmitted outward through the data transmitting antenna 6. After the sequential operations have been completed, the IC card is brought to the waiting state again.

Figure 2:
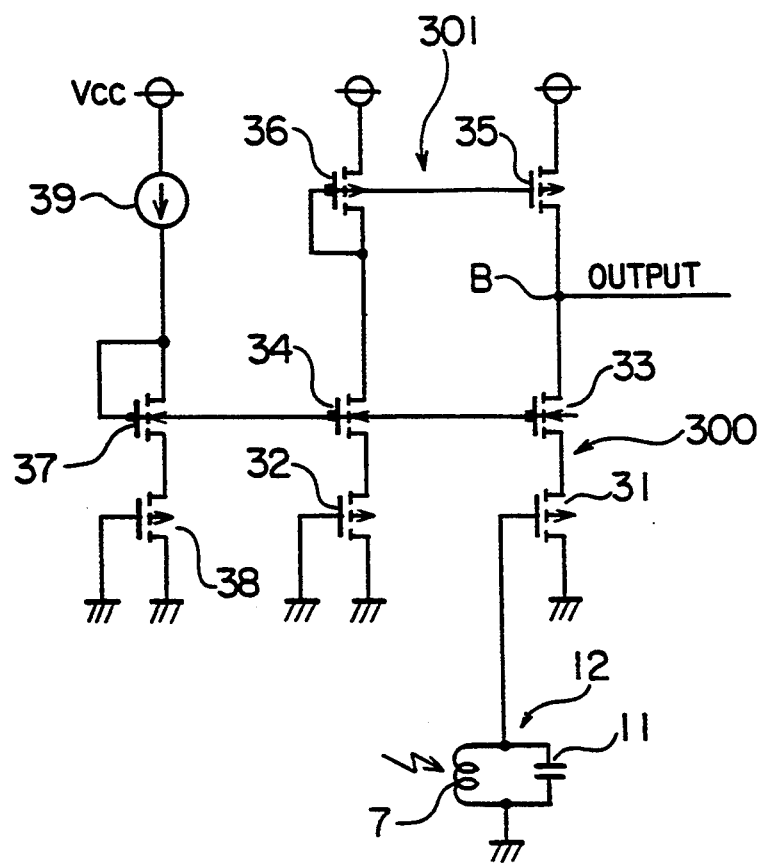
FIG. 2 is a circuit diagram which illustrates a receiving circuit in a microcomputer according to the embodiment of FIG. 1.

A circuit diagram of the receiving circuit 40 in the microcomputer 50 is shown in FIG. 2. A capacitor 11 is connected in parallel with the data receiving antenna 7 a resonant circuit 12 for receiving electromagnetic waves of a predetermined frequency. On the other hand, a differential circuit 300 includes a first pair of the transistors 31 and 32 and a second pair of the transistors 33 and 34. Each source of the P-channel transistors 31 and 32 is connected to the source of the N-channel transistors 33 and 34 while each gate of the same is connected to the resonant circuit 12 and ground. A current mirror circuit 301 is, as a load, connected to the differential circuit 300, the current mirror circuit 301 including a third pair of transistors 35 and 36. The drains of the P-channel transistors 35 and 36 are connected to the corresponding drains of the N-channel transistors 33 and 34. The gates of the transistors 35 and 36 are connected to each other and are connected to the drain of the transistor 36.

The gate of an N-channel transistor 37 is connected to each gate of the second pair of the transistors 33 and 34 in the differential circuit 300, while the source of the transistor 37 is grounded via the P-channel transistor 38. The drain of the transistor 37 is connected to a constant-current source 39. The size of the third pair of transistors 35 and 36 of the current mirror circuit 301 are chose so that the driving performance of the transistor 35 is larger than that of the transistor 36. On the other hand, the first pair of the transistors 31 and 32 and the second pair of transistors 33 and 34 are respectively chosen so that the transistors forming each pair have the same performance characteristics, i.e., are matched. Furthermore, junction B between the transistor 33 in the differential circuit 300 and the transistor 35 in the current mirror circuit 301 is connected to the CPU 1 as an output from the receiving circuit 40.

In the receiving circuit 40, a predetermined gate voltage is supplied to the second pair of transistors 33 and 34 of the differential circuit 300 by the transistors 37, 38, and the constant current power source 39. Assuming that the third pair of transistors 35 and 36 of the current mirror circuit 301 have the same performance characteristics, the threshold level for the input signal to be supplied from the resonant circuit 12 to the gate of the transistor 31 which forms a pair with the transistor 32 becomes 0 V since the gate of the transistor 32 in the differential circuit 300 is grounded. However, since the driving performance of the transistor 35 is larger than that of the transistor 36 according to this embodiment, the current passing through the transistor 35 is larger than the bias current passing through the transistor 31 when the gate voltage of the transistor 31 is 0 V. When the gate voltage of the transistor 31 is lowered from 0 V toward a more negative voltage, the bias current of the transistor 31 gradually increases. As a result, each of the currents passing through the transistors 35 and 31 the same at a predetermined negative gate voltage. The negative gate voltage of the transistor 31 at this time becomes the threshold level $V_{TH}$ of the receiving circuit 40. When the level of gate voltage of the transistor 31 is further lowered toward a more negative value, the current passing through the transistor 31 becomes larger than the current passing through the transistor 35. Therefore, the output current of the receiving circuit 40 passing through the junction B and the input voltage from the resonance circuit 12 have the relationship shown in FIG. 3.

Referring to FIG. 2, the input voltage generated in resonant circuit 12 in accordance with the received electromagnetic wave at the data receiving antenna 7 is compared to the threshold level $V_{TH}$ in the receiving circuit 40. If the input voltage is smaller than the threshold level $V_{TH}$, it is determined that electromagnetic waves have been received. As a result, an output signal is output from the junction B to the CPU 1.

Figure 3:
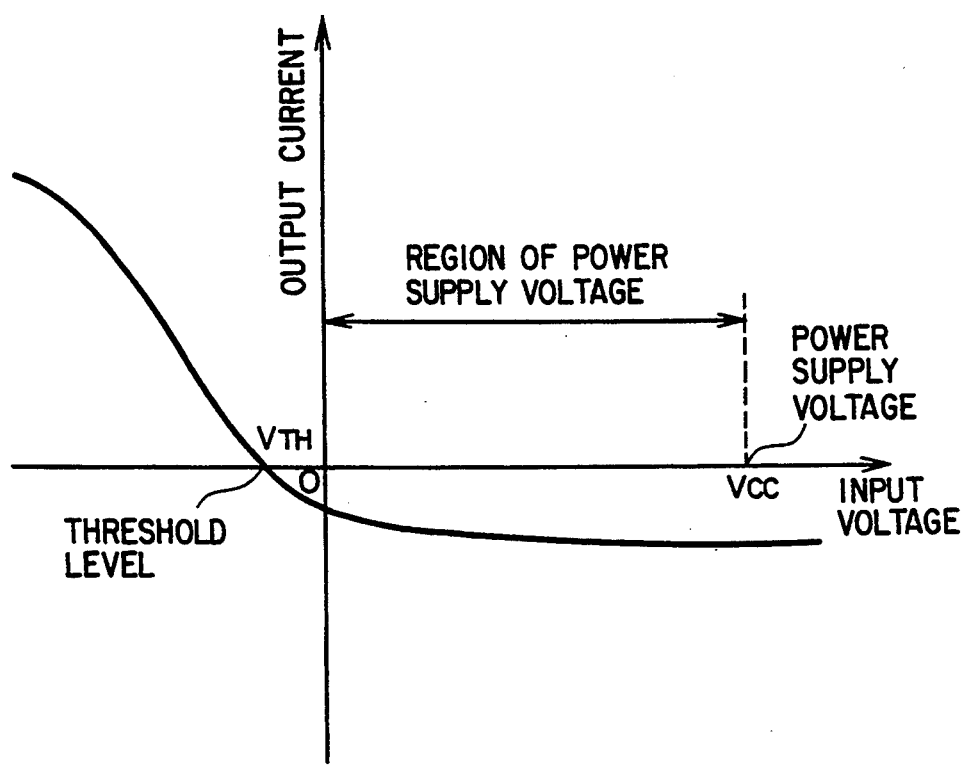
FIG. 3 is a graph which illustrates I/O characteristics of the circuit shown in FIG. 2.
Figure 4:
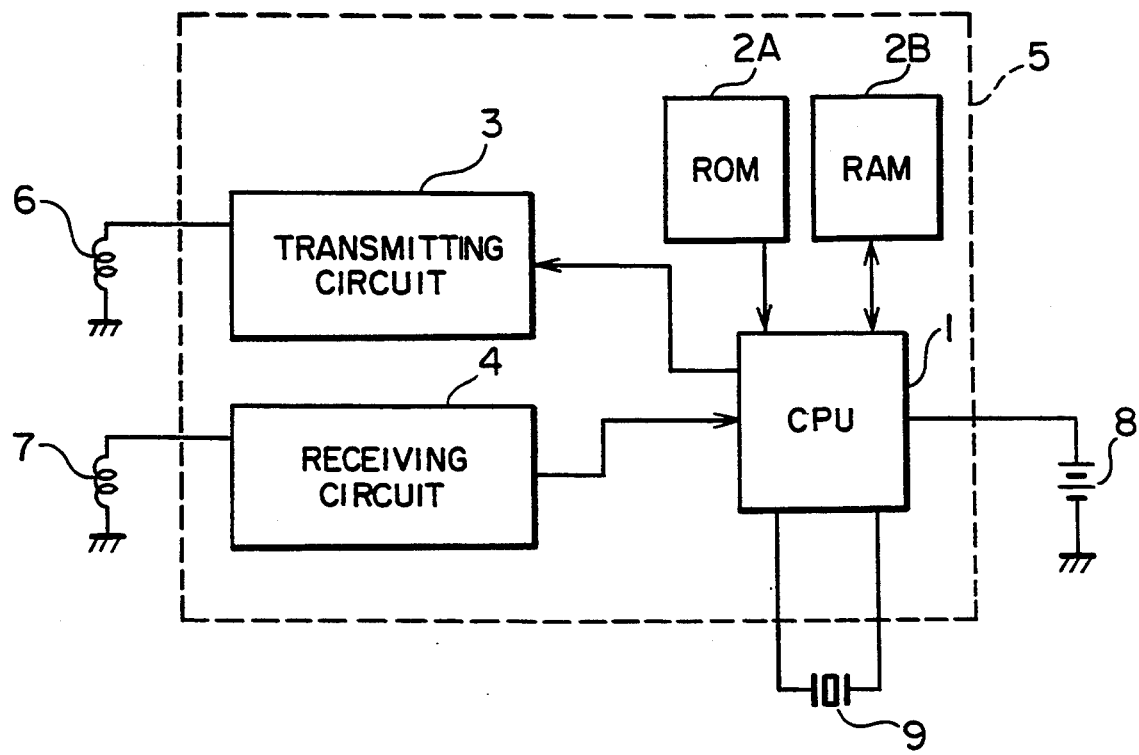
FIG. 4 is a block diagram which illustrates a conventional non-contact IC card.
Figure 5:
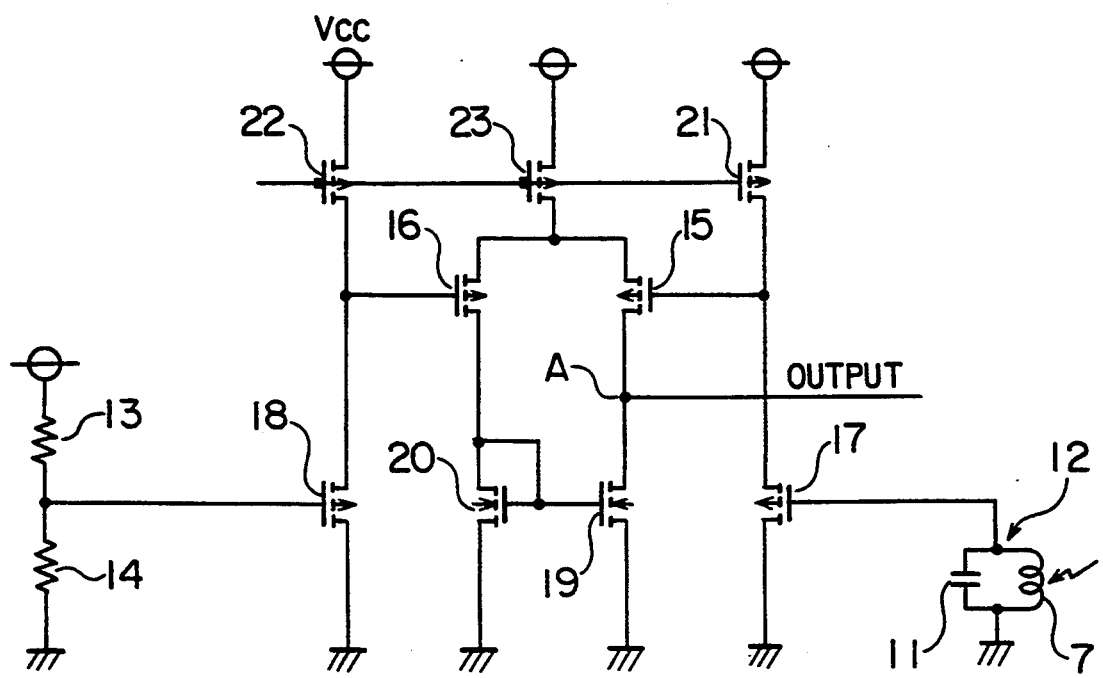
FIG. 5 is a circuit diagram which illustrates a receiving circuit in the microcomputer used in the IC card shown in FIG. 4.

As shown in FIG. 3, electric power consumption can be reduced since the bias current of the transistor 31, when the input signal from the resonance circuit 12 is 0 V, is reduced by determining that the threshold level $V_{TH}$ of the receiving circuit 40 is negative, that is, is outside the range (0 to $V_{CC}$) of the power supply voltage $V_{CC}$. Furthermore, when a voltage smaller than the threshold level $V_{TH}$ is supplied from the resonance circuit 12, electric power consumption is increased. As a result, predetermined frequency characteristics can be obtained. Furthermore, since the threshold level $V_{TH}$ Of the receiving circuit 40 is determined to be outside the range of the power supply voltage $V_{CC}$ by exploiting the performance characteristic differences between the third transistors 35 and 36, it is not necessary to generate a reference voltage for the differential circuit 300 with resistors in a voltage divider network. Therefore, a further reduction in electric power consumption is achieved.

The structure shown in FIG. 2 may be changed to another receiving circuit in which the threshold level $V_{TH}$ is also outside the range of the power supply voltage $V_{CC}$. In another embodiment the P-channel transistors 31, 32, 35, 36, and 38 are replaced by N-channel transistors, the N-channel transistors 33, 34, 37 are replaced by P-channel transistors, the power source line and the ground line are interchanged, and the polarity of the constant current source 39 is inverted. In this structure, the threshold level $V_{TH}$ is determined to be a larger positive value than the power supply voltage $V_{CC}$.

What is claimed is:

1. A microcomputer comprising:
    a CPU for processing data, said CPU for connection to a power supply external to said microcomputer, the power supply supplying a power supply voltage to said CPU;
    a memory connected to said CPU for storing a program for operating said CPU;
    an input circuit connected to said CPU for establishing a threshold voltage having a magnitude and polarity outside a voltage range extending from zero volts to the power supply voltage, for detecting as a detected signal an input signal applied to said input circuit and that has (i) an input magnitude and input polarity outside the range and (ii) an input polarity that is the same as the polarity of the threshold voltage and an input magnitude exceeding the magnitude of the threshold voltage, and for supplying a detected signal to said CPU, said input circuit including a differential circuit for comparing the input signal to the threshold voltage and receiving a bias current, the bias current increasing as the input signal departs from the range, and a current mirror circuit connected to said differential circuit as a load, said current mirror circuit including a pair of transistors, each of said transistors having different electrical characteristics; and
    an output circuit connected to said CPU for outputting from said microcomputer a signal output by said CPU in response to a detected signal supplied to said CPU.

2. A microcomputer according to claim 1 wherein the threshold voltage has a negative polarity and the power supply voltage has a positive polarity.

3. A microcomputer according to claim 1 wherein the threshold voltage has a positive polarity and a magnitude larger than the power supply voltage.

4. A non-contact IC card comprising:
    antenna means for transmitting data to and receiving data from an external device;
    a CPU for processing data;
    a battery connected to said CPU for supplying a power supply voltage to said CPU;
    a memory connected to said CPU for storing a program for operating said CPU;
    a receiving circuit connected to said antenna means and said CPU for establishing a threshold voltage having a magnitude and polarity outside a voltage range extending from zero volts to the power supply voltage, for detecting as a detected signal an input signal received by said antenna means and that has (i) an input magnitude and input polarity outside the range and (ii) an input polarity that is the same polarity of the threshold voltage and an input magnitude exceeding the magnitude of the threshold voltage, and for supplying a detected signal to said CPU, said receiving circuit including a differential circuit for comparing the input signal to the threshold voltage and receiving a bias current, the bias current increasing as the input signal departs from the range, and a current mirror circuit connected to said differential circuit as a load, said current mirror circuit including a pair of transistors, each of said transistors having different electrical characteristics; and
    a transmitting circuit connected to said CPU for transmitting through said antenna means an output signal output by said CPU in response to a detected signal supplied to said CPU.

5. A non-contact IC card according to claim 4 wherein the threshold voltage has a negative polarity and the power supply voltage has a positive polarity.

6. A non-contact IC card according to claim 4 wherein the threshold voltage has a positive polarity and a magnitude greater than the power supply voltage.

* * * * *